United States Patent
Gulin et al.

(10) Patent No.: US 10,339,187 B2
(45) Date of Patent: Jul. 2, 2019

(54) SYSTEM AND METHOD FOR CONDUCTING A SEARCH

(71) Applicant: YANDEX EUROPE AG, Lucerne (CH)

(72) Inventors: Andrey Vladimirovich Gulin, Moscow region (RU); Alexei Aleksandrovich Kirichun, Moscow (RU)

(73) Assignee: Yandex Europe AG, Lucerne (CH)

( * ) Notice: Subject to any disclaimer, the term of this patent is extended or adjusted under 35 U.S.C. 154(b) by 323 days.

(21) Appl. No.: 15/307,395

(22) PCT Filed: Dec. 28, 2014

(86) PCT No.: PCT/IB2014/067368
§ 371 (c)(1),
(2) Date: Oct. 28, 2016

(87) PCT Pub. No.: WO2015/198116
PCT Pub. Date: Dec. 30, 2015

(65) Prior Publication Data
US 2017/0061008 A1 Mar. 2, 2017

(30) Foreign Application Priority Data
Jun. 27, 2014 (RU) .............................. 2014126747

(51) Int. Cl.
*G06F 16/951* (2019.01)
*G06F 16/248* (2019.01)

(52) U.S. Cl.
CPC .......... *G06F 16/951* (2019.01); *G06F 16/248* (2019.01)

(58) Field of Classification Search
CPC ......... G06F 17/30554; G06F 17/30864; G06F 16/951; G06F 16/248
(Continued)

(56) References Cited

U.S. PATENT DOCUMENTS 6,490,579 B1 * 12/2002 Gao .................. G06F 17/30864
707/707
6,636,853 B1 10/2003 Stephens, Jr.
(Continued)

FOREIGN PATENT DOCUMENTS

RU 2343537 C2 10/2005
RU 2382400 C2 7/2006
(Continued)

OTHER PUBLICATIONS

Aggarwal, Sudhir, et al., "WIRE—A WWW-based Information Retrieval and Extraction System", DEXA 1998, Vienna, Austria, Aug. 26-28, 1998, pp. 887-892.*
(Continued)

*Primary Examiner* — Robert Stevens
(74) *Attorney, Agent, or Firm* — BCF LLP (57) ABSTRACT

A method of conducting a search is executable at a server communicatively coupled to an electronic device via a communication network. The method includes receiving, via the communication network, a search query from the electronic device, and responsive thereto, determining a search query relevant host including a plurality of resources related to at least a portion of the search query. A search query relevant resource address associated with a search query relevant resource is generated. The search query relevant resource is relevant to the search query. The search query relevant resource address is based on an address template associated with the search query relevant host and at least a portion of the search query. The electronic device is caused to display a search engine results page (SERP) including a search result indicative of at least one of: the search query relevant resource and the search query relevant resource address.

14 Claims, 5 Drawing Sheets

(58) Field of Classification Search
USPC .......................................................... 707/706
See application file for complete search history.

(56) References Cited

U.S. PATENT DOCUMENTS

| | | | |
|---|---|---|---|
| 7,010,742 B1 | 3/2006 | Hsu et al. | |
| 7,921,097 B1 | 4/2011 | Dandekar et al. | |
| 8,200,617 B2 | 6/2012 | Spivack et al. | |
| 8,402,047 B1* | 3/2013 | Mangini | G06F 17/243 707/769 |
| 8,775,396 B2* | 7/2014 | Shuster | G06F 16/248 707/705 |
| 2004/0054671 A1 | 3/2004 | Cohen et al. | |
| 2004/0143787 A1 | 7/2004 | Grancharov et al. | |
| 2005/0177595 A1 | 8/2005 | Krieg et al. | |
| 2006/0161542 A1 | 7/2006 | Cucerzan et al. | |
| 2006/0167864 A1* | 7/2006 | Bailey | G06Q 10/02 |
| 2008/0208846 A1 | 8/2008 | Panarese | |
| 2008/0235187 A1 | 9/2008 | Gade et al. | |
| 2008/0281699 A1 | 11/2008 | Whitehead | |
| 2008/0306933 A1* | 12/2008 | Valliani | G06F 16/9577 |
| 2008/0313178 A1* | 12/2008 | Bates | G06F 16/951 |
| 2009/0313265 A1* | 12/2009 | Sifry | G06F 16/285 |
| 2010/0131902 A1 | 5/2010 | Teran et al. | |
| 2010/0235338 A1* | 9/2010 | Gabriel | G06F 17/30864 707/706 |
| 2010/0268702 A1* | 10/2010 | Wissner | G06F 17/30705 707/711 |
| 2011/0072045 A1* | 3/2011 | Drake | G06F 16/951 707/770 |
| 2011/0307462 A1 | 12/2011 | Holsman et al. | |
| 2012/0323898 A1 | 12/2012 | Kumar et al. | |
| 2013/0031078 A1* | 1/2013 | El Daher | G06F 17/30867 707/706 |
| 2013/0073536 A1 | 3/2013 | Fedirynski et al. | |
| 2013/0191723 A1* | 7/2013 | Pappas | G06F 17/2247 715/234 |
| 2014/0250106 A1* | 9/2014 | Shapira | G06F 17/30864 707/722 |
| 2014/0280253 A1* | 9/2014 | Clark | G06F 16/3344 707/755 |

FOREIGN PATENT DOCUMENTS

| | | |
|---|---|---|
| RU | 2292078 C1 | 1/2007 |
| RU | 2339078 C2 | 11/2008 |
| WO | 2010/120929 A2 | 10/2010 |

OTHER PUBLICATIONS

Dűpmeier, Clemens, et al., "Towards a Universal Search in Environmental Information Systems", ISESS 2011, Brno, Czech Republic, Jun. 27-29, 2011, pp. 319-326.*
Passornpakorn, W., et al., "Design Framework for Ontology Based Interactive E-health Services", ICUFN 2013, Da Nang, Vietnam, Jul. 2-5, 2013, pp. 389-394.*
Lanthaler, Markus, et al., "SAPS: Semantic AtomPub-based Services", SAINT 2011, Munich, Germany, Jul. 18-21, 2011, pp. 382-387.*
Balaji, S., et al., "TOPCRAWL: Community Mining in Web search Engines with emphasize on Topical Crawling", ICPRIME-2012, Salem, Tamilnadu, India, Mar. 21-23, 2012, pp. 20-24.*
International Search report from PCT/IB2014/067368 dated Jun. 1, 2015; Blaine R. Copenheaver, 1 page.
OpenSearch description document, http://www.opensearch.org/Specifications/OpenSearch/1.1#OpenSearch_description_document, retrieved on Jan. 20, 2017, 27 pages.

* cited by examiner

SYSTEM AND METHOD FOR CONDUCTING A SEARCH

CROSS-REFERENCE

The present application claims priority to Russian Patent Application No. 2014126747, filed Jun. 27, 2014, entitled "SYSTEM AND METHOD FOR CONDUCTING A SEARCH" the entirety of which is incorporated herein.

FIELD

The present technology relates to search engines in general and specifically to a system and method for conducting a search.

BACKGROUND

There are many content providers providing a vast quantity of information which can be accessed via various kinds of global or local communications networks (the Internet, the World Wide Web, local area networks and the like). The available information includes a variety of content types, such as photos, video, audio and the like, and relates to a wide range of topics, such as but not limited to news, weather, traffic, entertainment, finance and the like. The information can be accessed using a wide range of electronic devices such as desktop computers, laptop computers, smartphones, tablets and the like.

Generally, in order to access a given piece of information via a communication network, a user can locate the given piece of information by providing the specific address where that information is located, or by conducting a search, using a search engine, to locate the given piece of information. The latter is particularly suitable in circumstances, where the user does not know the exact address where the information is stored. When using a search engine to locate a given piece of information, the user generally desires to locate the most relevant results and to locate the results relatively quickly.

For search engine providers, therefore, it is important to be able to fulfil these objectives (relevancy of results, speed, etc.) and to do so without using extensive resources such as bandwidth, and processing capacity. In a typical search engine, a crawler is used to index various resources on the Internet. In order to index a page, the crawler needs to "visit" the web page. There are various means available for the crawler to "learn" which pages to visit—i.e. which URL address to hit in order to visit the page and index it. Most crawlers use links within documents and web resources to find URLs on the Internet to visit. However, there are several web resources that have too many "potential pages" (i.e. combinatory explosion as it is known in the art). For example, on a web site for booking air tickets, the combination of potential pages is enormous—for each departure point, destination point, date, price range—each combination is assembled at a particular URL. It is impractical, and hugely resource intensive for a search engine provider to "crawl" and index all available resources. There is thus a need for a faster and more efficient method and system for providing relevant search results to a user.

SUMMARY

It is an object of the present technology to ameliorate at least some of the inconveniences present in the prior art.

In one aspect, the present provides a method of conducting a search, the method being executable at a server communicatively coupled to a user electronic device via a communication network. The method includes receiving, via the communication network, a search query from the user electronic device, and responsive to receiving the search query, determining a search query relevant host. The search query relevant host includes a plurality of resources related to at least a portion of the search query. A search query relevant resource address associated with a search query relevant resource is generated. The search query relevant resource is relevant to the search query. The search query relevant resource address is based on an address template associated with the search query relevant host and at least a portion of the search query. The method also includes causing the user electronic device to display a search engine results page (SERP). The SERP includes a search result indicative of least one of: the search query relevant resource and the search query relevant resource address.

In another aspect, the search query relevant host is determined based on at least a portion of the search query.

In yet another aspect, the search query relevant host is determined by conducting a search based on at least a portion of the search query.

In another aspect, the search query relevant host is determined based on the search query relevant host being known to include the search query relevant resource.

In a further aspect, after generating the search query relevant resource address, the availability of the search query relevant resource at the search query relevant resource address is verified.

In an additional aspect, the address template is received from the search query relevant host.

In a further aspect, the address template associated with the plurality of resources of the search query relevant host is received from the search query relevant host.

In another aspect, the address template is received from the search query relevant host prior to receiving the search query.

In another aspect, the receiving occurs responsive to receiving the search query and determining the search query relevant host.

In an additional aspect, each of the plurality of resources is associated with a respective resource address and the address template is obtained by processing the respective resource address of each of the plurality of resources.

In a further aspect, each of the plurality of resources is associated with a respective resource address, and the address template comprises a rule for generating the respective resource addresses of each of the plurality of resources.

In another aspect, the search query includes a search parameter, each of the plurality of resources being different from an other of the plurality of resources based on the search parameter.

In another aspect, the search query includes a search parameter, and generating a search query relevant resource address includes merging the search parameter into said address template.

In another aspect, a server communicatively coupled to a user electronic device via a communication network is provided. The server includes a processing module configured to receive, via the communication network, a search query from the user electronic device, and responsive to receiving the search query, determine a search query relevant host. The search query relevant host hosts a plurality of resources related to the search query. The processing module is further configured to generate a search query relevant resource address associated with a search query relevant resource and to cause the user electronic device to display a search engine results page (SERP). The SERP includes a search result indicative of least one of: the search query relevant resource and the search query relevant resource address. The search query relevant resource is relevant to the search query. The search query relevant resource address is based on an address template associated with the search query relevant host.

In a further aspect, the processing module is also configured to process the search query to determine a search parameter.

In an additional aspect, the processing module is further configured to generate said search query relevant resource address by merging said search parameter with said address template.

In another aspect, the processing module is operatively coupled to a search module for conducting a search, the search query relevant host being determined by conducting the search based on at least a portion of the search query.

In another aspect, the processing module is communicatively coupled to the search query relevant host for verifying the availability of the search query relevant resource at the search query relevant resource address after generating the search query relevant resource address.

In yet another aspect, the processing module is communicatively coupled to the search query relevant host and further configured to receive the address template from the search query relevant host.

In an additional aspect, each of the plurality of resources is associated with a respective resource address, and the processing module is further configured to process the respective resource address of each of the plurality of resources of the search query relevant host to obtain the address template.

In the context of the present specification, unless provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device", "user device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
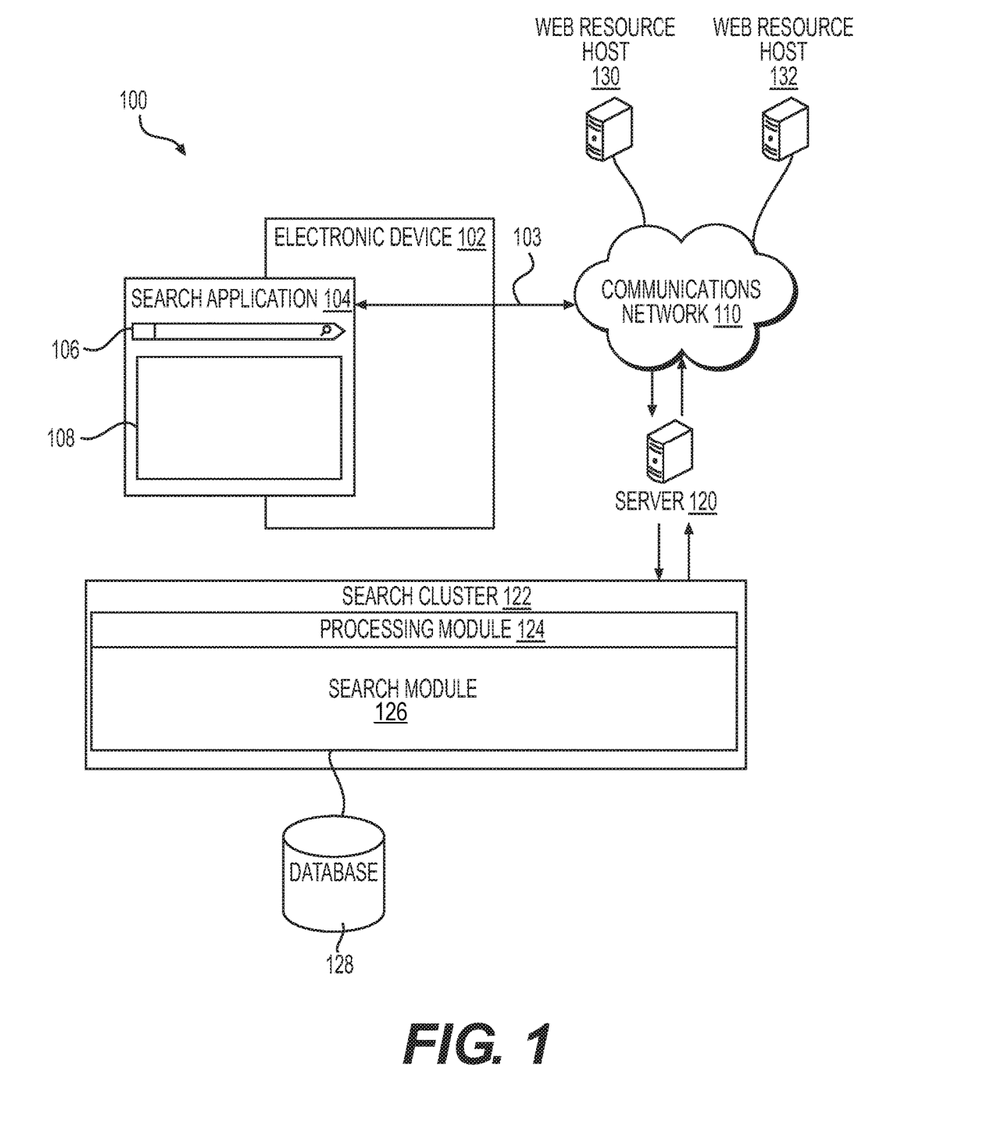
FIG. 1 is a schematic illustration of a network environment in accordance with non-limiting embodiments of the present technology and including a user electronic device and a search engine server in accordance with non-limiting embodiments of the present technology.

With reference to FIG. 1, there is shown a schematic diagram of a network environment 100 suitable for implementing non-limiting embodiments of the present technology. It is to be expressly understood that the network environment 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes an electronic device 102, and a communication network 110. The electronic device 102 is coupled to the communications network 110 via a communication link 103. The electronic device 102 is typically associated with a user (not depicted) and, as such, can sometimes be referred to as a "user electronic device" or a "client device". In the illustrated embodiment, the electronic device 102 is a laptop computer. The implementation of the electronic device 102 is however not limited to a laptop computer 102. As an example, the electronic device 102 may be implemented as a smartphone, a personal computer (desktops, laptops, netbooks, etc.), a wireless electronic device (a cell phone, a smartphone, a tablet and the like), as well as network equipment (a router, a switch, or a gateway). The general implementation of the electronic device 102 is known in the art and, as such, will not be described here at much length.

Although the present description is made with reference to the network environment 100 having one electronic device 102, it should be understood that the network environment 100 could include more than one electronic device 102.

The user electronic device 102 includes a user input interface (such as a keyboard, a mouse, a touch pad, a touch screen, microphone, and the like) for receiving user inputs. The electronic device 102 also includes a user output interface (such as a screen, a speaker, a printer and the like) for providing visual, auditory or tactile outputs to the user.

The user electronic device 102 includes a network communication interface (such as a modem, a network card and the like) for two-way communication over the communications network 110 via the communication link 103. The electronic device 102 also includes a processor coupled to the user input interface, the user output interface and the network communication interface. The processor is configured to execute various methods, including those described herein below. To that end the processor may store or have access to computer readable commands which, when executed, cause the processor to execute the various methods described herein. The user electronic device 102 comprises hardware and/or software and/or firmware, as is known in the art, to execute various applications. Some of the applications are configured to receive and transmit information via the communication network 110. Examples of such applications include a browser application, a search application, a music streaming application, a photo sharing application, and the like.

In the illustrated embodiment of the present technology, the communications network 110 is implemented as the Internet. In other embodiments of the present technology, the communications network 110 can be implemented differently, such as a wide-area communications network, a local-area communications network, a private communications network and the like.

The communication link 103 can also have various non-limiting implementations, and the particular implementation(s) of the communication link 103 for the user electronic device 102 will depend on how the electronic device 102 is implemented. In the illustrated embodiment of the present technology where the user electronic device 102 is implemented, as a laptop, the communication link 103 for the first electronic device 102 can be either wireless (such as the Wireless Fidelity, or WiFi® for short, Bluetooth® or the like) or wired (such as a Universal Serial Bus or USB-based connection). Furthermore, the communication link 103 coupling the electronic device 102 to the communication network 110 could include more than one type of link. For example, in this exemplary embodiment, the laptop 102 could be coupled to the network 110 via wireless as a well as a wired connection.

It should be expressly understood that implementations for the electronic device 102, the communication link 103 and the communications network 110 are provided for illustration purposes only. As such, those skilled in the art will easily appreciate other specific implementational details for the electronic device 102, 104, the communication link 103, 105 and the communications network 110. As such, by no means, examples provided herein above are meant to limit the scope of the present technology.

Also coupled to the communications network 110 is a search engine server 120 for conducting searches responsive to search queries received at the search engine server 120. The search engine server 120 is connected to the electronic device 102 via the communication network 110. The search engine server 120 could also be connected to other servers, such as but not limited to network configuration servers, network resource servers, application servers, and other network configuration servers, via the communication network 110.

The search engine server 120 can be implemented as a conventional computer server. In an example of an embodiment of the present technology, the search engine server 120 can be implemented as a Dell™ PowerEdge™ Server running the Microsoft™ Windows Server™ operating system. The search engine server 120 could also be implemented as other kinds of network equipment such as, but not limited to, a router, a switch, or a gateway, a base station and the like. The search engine server 120 can be implemented in any suitable hardware and/or software and/or firmware, or a combination thereof. In the depicted non-limiting embodiment of present technology, the search engine server 120 is a single server. In alternative non-limiting embodiments of the present technology, the functionality of the search engine server 120 may be distributed and may be implemented via multiple servers. The implementation of the search engine server 120 is well known. However, briefly speaking, the search engine server 120 comprises a network communication interface (not shown) structured and configured to communicate with the electronic device 102 and other devices coupled to the communications network 110. The search engine server 120 further comprises at least one computer processor (not shown) operationally connected with the communication interface and structured and configured to execute various processes to be described herein.

The network environment 100 also includes a first web resource host 130 and a second web resource host 132. The first web resource host 130 hosts a plurality of web resources that can be accessed by connecting to the first web resource host 130 via the communication network 110. The second web resource host 132 hosts a plurality of web resources that can be accessed by connecting to the second web resource host 132 via the communication network 110. The first and second web resource hosts 130, 132 may also be connected to each other via the communication network 110, or even directly. For example, the first web resource host 130 could be the host for the site http://www.cheaptickets.example and the second web resource host 132 could be the host for the site for the Louvre Museum http://www.louvre.example. In this example, the first web resource host 130 hosts numerous webpages (resources), each page corresponding to tickets and information related thereto for a particular combination of travel (including mode of travel, departure point, destination point, dates, etc.). The second web resource host 132 hosts a plurality of pages (web resources) related to the exhibits at the Louvre Museum, for example, each page could include information about a particular work such as the painting Mona Lisa and the like.

In the illustrated example, each of the web resource hosts 130, 132 is implemented as a separate server. Akin to the search engine server 120, each of the web resource hosts 130, 132 can be implemented as a conventional computer server. In an example of an embodiment of the present technology, each of the network resource hosts 130, 132 can be implemented as a Dell™ PowerEdge™ Server running the Microsoft™ Windows Server™ operating system. Each of the network resource hosts 130, 132 can also be implemented in any other suitable hardware and/or software and/or firmware or a combination thereof. In the depicted non-limiting embodiment of present technology, each web resource host 130, 132 is a single server. In alternative non-limiting embodiments of the present technology, the functionality of each web resource host 130, 132 may be distributed and may be implemented via multiple servers. It is also contemplated that the web resource hosts 130, 132 could be implemented by the same server.

It should also be understood that the web resource hosts 130, 132 and the web resources hosted by the hosts 130, 132 as presented herein are exemplary. The network environment 100 could include any number and kind of network resource servers and each network resource server could host any number and kind of network resources. In the illustrated embodiment, for convenience and simplification of description of the present technology, each of the network resource hosts 130, 132 is assumed to be a web-resource server and the network resources hosted by the network resource hosts 130, 132 are assumed to be web resources (or websites). It should however be understood, that the present technology is no way limited to web resource servers and web resources.

Search Application

The electronic device 102 comprises hardware and/or software and/or firmware (or a combination thereof), as is known in the art, to execute a search application 104. Generally speaking, the purpose of the search application 104 is to enable the user (not depicted) to execute a search using the above-mentioned search engine server 120.

The implementation of the search application 104 is not particularly limited. One example of the search application 104 may be embodied in a user accessing a web site associated with a search engine to access the search application 104. For example, the search application can be accessed by typing in an URL associated with a search engine at http://www.search.example. It should be expressly understood that the search application 104 can be accessed using any other commercially available or proprietary search engine. Thus is in this exemplary embodiment, the search application 104 is executed via a browser application.

Generally, speaking, the search application 104 comprises a query interface 106 and a search result interface 108. The general purpose of the query interface 106 is to enable the user (not depicted) to enter a search query or a "search string". The general purpose of the search result interface 108 is to provide search results that are responsive to the user query entered into the query interface 106. The processing of the search query and the presentation of the search results will be described in detail below.

The search engine server 120 is communicatively coupled (or otherwise has access) to a search cluster 122. The general purpose of the search cluster 122 is to perform searches in response to the user queries inputted via the query interface 106 and to output search results to be presented to the user using the search results interface 108. What follows is a description of one non-limiting embodiment of the implementation for the search cluster 122. However, it should be understood that there is a number of alternative non-limiting implementations of the search cluster 122 possible. It should be also understood that in order to simplify the description presented herein below, the configuration of the search cluster 122 has been greatly simplified. It is believed that those skilled in the art will be able to appreciate implementational details for the search cluster 122 and for components thereof that may have been omitted for the purposes of simplification of the description.

Generally speaking the purpose of the search cluster 122 is to (i) conduct searches; (ii) execute analysis of search results and perform ranking of search results; (iii) group results and compile the search engine result page (SERP) to be outputted to the electronic device 102. The configuration of the search cluster 122 for executing searches is not particularly limited. Those skilled in the art will appreciate several methods and techniques for executing the search using the search cluster 122 and as such, some of the structural components of the search cluster 122 will only be described at a high level.

In some non-limiting implementations of the present technology, the search cluster 122 comprises a processing module 124. The processing module 124 can execute several searches, including but not limited to, a general search, a vertical search, a meta search, a multi-level search, and the like. The specific details of the different kinds of searches will not be discussed herein as the description is not intended to be limited to any one kind of search. Any type of search, using any type(s) of methods and techniques as will be understood by a skilled worker may be used to conduct the searches described herein. To that end, the processing module 124 comprises (or has access to) a search module 126.

The web search module 126 has access to a database 128 to conduct the web search(es). Although the database 128 is illustrated schematically herein as a single entity, it is contemplated that the database 128 can be implemented in a distributed manner, for example, the database 128 could have different components, each component being configured for a particular kind of search. It is also contemplated that the search module 126 could have access to a plurality of databases 128. Although the search module 126 is shown herein as being connected to a single database 128, the present technology is not intended to be limited to a single database 128.

In addition, although the illustrated embodiment of FIG. 1 shows the processing module 124 being connected to a single search module 126, it is contemplated that the processing module 124 could be connected to a plurality of search modules 126. In some implementations, some of the plurality of search modules 126 could be configured to conduct different types of searches, such as a general search, a vertical search, and the like. To that end, each of the plurality of search modules 126 could be could have access to a database 128 that is relevant to the particular type of search it is configured to conduct.

In addition, even though the web search module 126 is depicted as a single entity, in alternative non-limiting embodiments of the present technology the web search module 126 may also be implemented in a distributed manner. For example, each of the distributed implementations of the web search modules 122 may be dedicated to search queries originating from a particular geographical region. In those non-limiting embodiments of the present technology, the processing module 124 may determine a location and/or an IP address associated with the electronic device 102 associated with the user who is submitting the search query. Based on the so-determined location and/or the IP address of the electronic device 102, the processing module 124 may forward the search query to one of the distributed web search modules 126 to perform the search.

Merely for the purposes of simplifying the description to be presented herein, only a high level description of one approach to executing a search will be presented herein below. It is expected that those skilled in the art will be able to configure the search engine server 120 and the search cluster 122 in any number of known ways without undue experimentation or burden.

Once received at the search engine server 120, the search query is processed to determine various search parameters. For the sake of example and not a limitation, in some non-limiting embodiments of the present technology, as part of processing the search query by the search engine server 120 or the processing module 124, the search query is parsed. Parsing of the search query may be performed for a number of different reasons, such as to break the search query into key words or search parameters, to translate portions of the search query, to correct grammatical errors in the search terms, to weed out unnecessary terms and the like. In some non-limiting embodiments of the present technology, the search query is further parsed to determine a search intent parameter, which is indicative of what the user is desirous of receiving as a response to the search query.

The search intent parameter may be established based on information such as, but not limited to, the location of the electronic device when the search query is transmitted therefrom, or previous searched conducted by the electronic device 102. In alternative embodiments of the present technology, the search intent parameter can be established based on the search query in combination with other users' interactions with search results presented to them in response to the same or similar search queries in the past. For example, the search intent parameter can be determined based on what search results other users have selected in response to the same or similar queries in the past.

In some non-limiting embodiments of the present technology, the search query is further parsed to determine a results intent parameter, which is indicative as to how the user would like to receive the search results. It should be noted that different search parameters can be determined at different points in time.

The processing module 124 then sends the search query and/or the search parameters obtained by processing of the search query, to the search module 126. As mentioned above, the search module 126 could be a plurality of search modules 126 or a distributed search module 126. The responses from the search module 126 are received and compiled by the processing module 124.

The processing module 124 then executes a ranking function to generate a ranked search results set. In other words, the processing module 124 ranks the search results by their relevancy to the search query submitted by the user. As those skilled in the art will appreciate, relevancy within this description shall mean how responsive a given search result is to the user query. Those skilled in the art will appreciate various techniques available for ranking search results. The present description is not to be limited to any particular method of searching or ranking the obtained search results. The search cluster 122 is then configured to transmit ranked search results to the search engine server 120. The search engine server 120 then communicates with the electronic device 102 to cause the search results to be output to the user output interface of the electronic device 102.

It should be noted that the above described architecture of system 100 of FIG. 1 has been depicted as an example only. Other non-limiting embodiments for the architecture of FIG. 1 are possible.

Method

Figure 2:
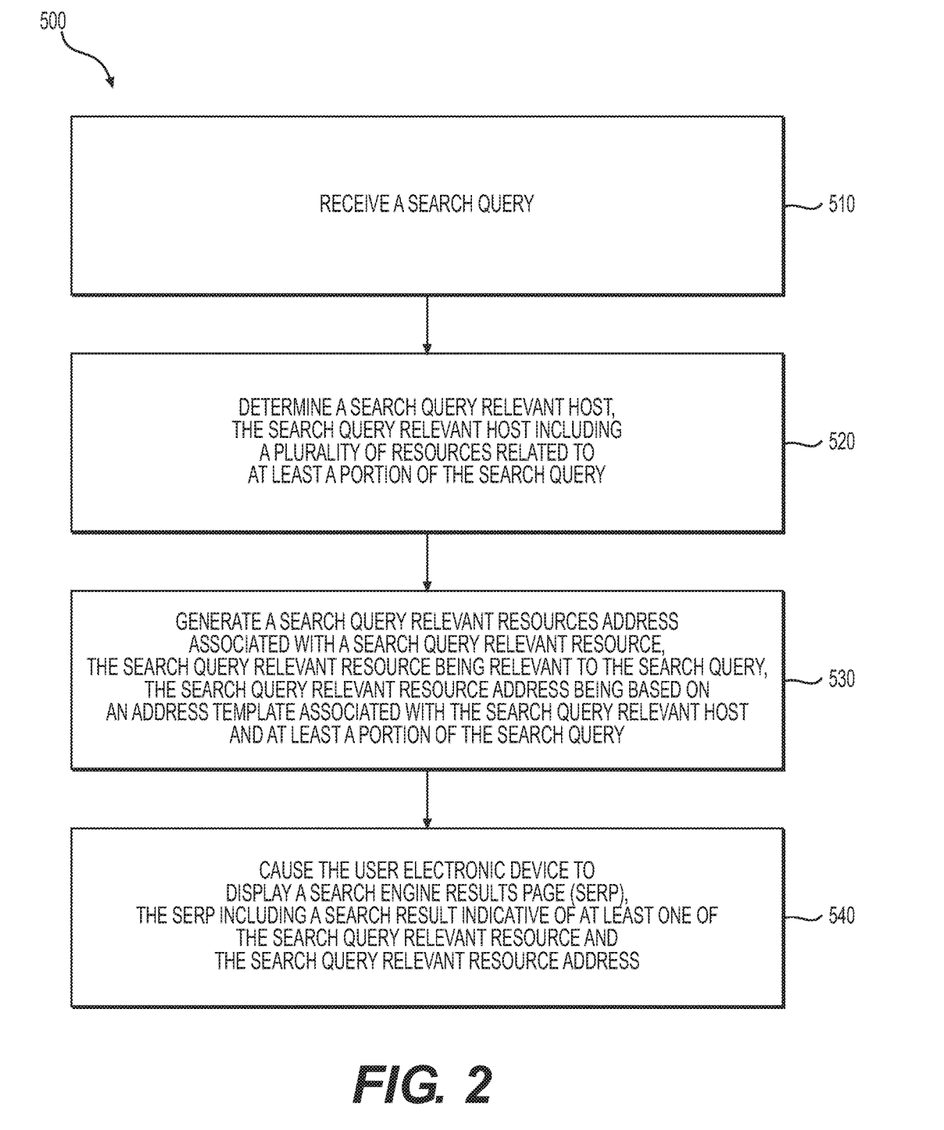
FIG. 2 is a block diagram depicting a method 200 implemented within the system 100 of FIG. 1 and in accordance with non-limiting embodiments of the present technology.

The method 500 of conducting a search will now be described with reference to FIGS. 2 to 3C. The method 500 is executed by the search engine server 120. It is also contemplated that portions of the method 500 could be executed by the electronic device 102.

The method 500 begins at step 510, where the search engine server 120 receives a search query from the electronic device 102 associated with the user. The step 510 is executed in response to the user entering a search query into the electronic device 102 using the query interface 106 of the search application 104. The search engine server 120 receives the search query via the communications network 110.

The method 500 will be explained below with reference to three different scenarios (FIGS. 3A to 3C), corresponding respectively to three different search queries 1110, 1210, 1310 received from the electronic device 102. It should be understood that the three search queries 1110, 1210, 1310 presented herein below are for illustration purposes only, and the present technology is in no way to be limited based on the three queries presented below.

Scenario 1: With reference to FIG. 3A, in this exemplary scenario, the user is searching for flight tickets for travel from Madrid to Moscow, leaving on July 11 and returning on July 15, and for a price below 800 Euro. As such, the user has entered the following search query 1110 in the query interface 106: "Madrid to Moscow flight July 11 to July 15 under 800 euros".

Scenario 2. With reference to FIG. 3B, in this exemplary scenario, the user is searching for the weather forecast in Moscow in July. As such, the user has entered the following search query 1210 in the query interface 106: "Weather Moscow July".

Scenario 3. With reference to FIG. 3C, in this exemplary scenario, the user is searching for information about the Mona Lisa painting. As such, the user has entered the following search query 1310 in the query interface 106: "Mona Lisa".

Determining a Search Query Relevant Host

After receiving the search query 1110, 1210, 1310 at step 510, the method 500 proceeds to step 520, where the search engine server 120 determines a search query relevant host. The search query relevant host includes a plurality of resources that are related to the received search query. The search query relevant host is a web resource host that hosts a plurality of web resources that are related to the search query.

The search query relevant host can be determined based on a portion of the search query 1110, 1210, 1310 received at step 510. The search query relevant host can be determined by conducting a search based on a portion of the search query 1110, 1210, 1310 received at step 510. The search query relevant host can also be determined based on the known fact that the search query relevant host includes a search query relevant resource, the search query relevant resource being relevant to the search query 1110, 1210, 1310. The search query relevant host can be determined based on processing or analyzing the search query 1110, 1210, 1310 to determine search parameter(s).

Figure 3A:
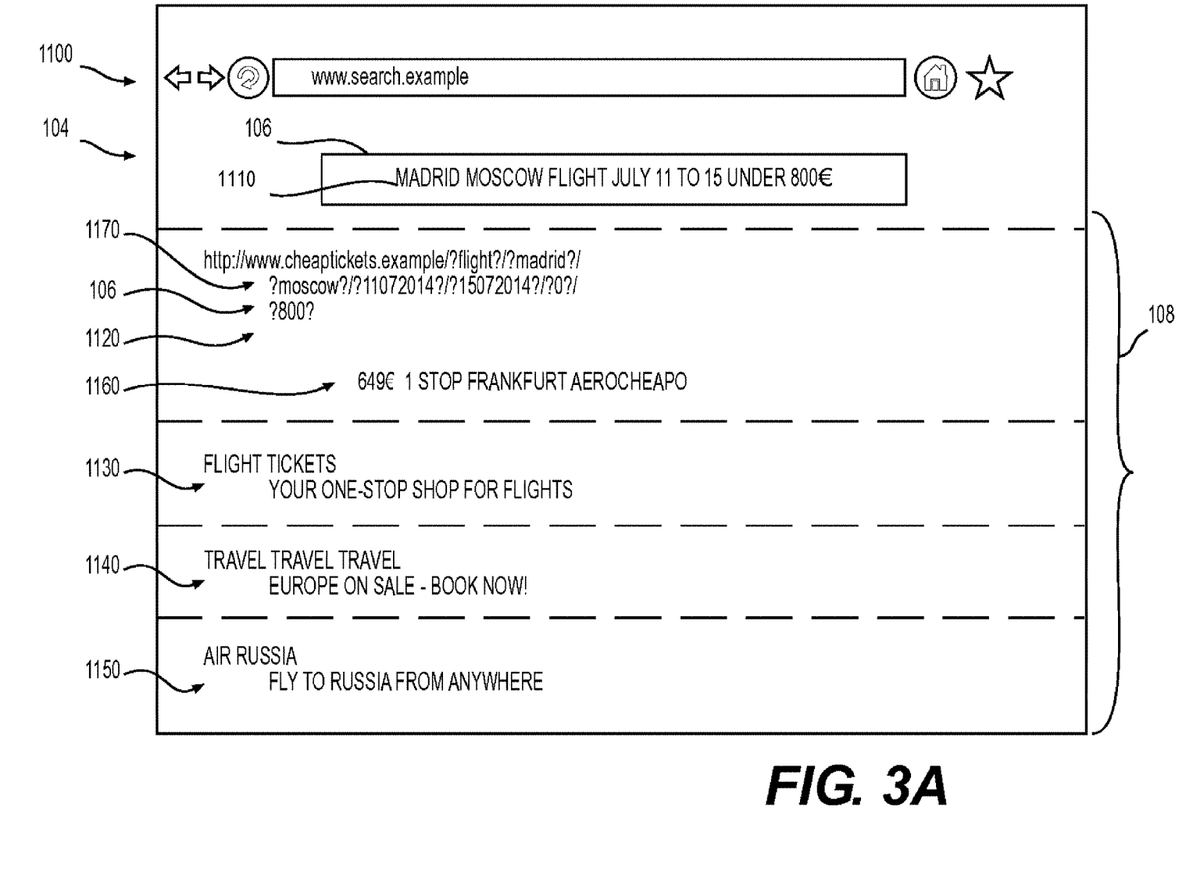
FIG. 3A illustrates a screen shot of a Search Results Page (SERP) including a deep link in accordance with non-limiting embodiments of the present technology.

With Reference to FIG. 3A, in exemplary scenario #1, the search query relevant host is determined to be http://www.cheaptickets.example which is a host site for shopping for tickets for all forms of travel, and for travel throughout the world. The search query 1100 "Madrid to Moscow flight July 11 to July 15 under 800 euros" is processed or analyzed to determine, inter alia, that the user is looking for information on purchasing a flight ticket. Based on this information (user looking for a flight ticket), the search engine server 120 determines that the host site http://www.cheaptickets.example would be a search query relevant host. Processing of the query 1100 also provides the search parameters for departure point, arrival point, departure date, arrival date, and upper cost limit.

The search query relevant host for this exemplary scenario #1, http://www.cheaptickets.example hosts a number of web pages (search query relevant resources), such as the ones listed below:

A web page, having information for a flight ticket from Madrid to Prague leaving on Jul. 20, 2014 and returning on Aug. 20, 2014, for under 2000 Euros, at the address http://www.cheaptickets.example/?flight?/?Madrid?/?Prague?/?20072014?/?20082014?/?0?/?2000?

A web page, having information for a flight ticket from Vienna to Prague leaving on Jul. 20, 2014 and returning on Aug. 20, 2014, for under 2000 Euros, at the address http://www.cheaptickets.example/?flight?/?Vienna?/?Prague?/?20072014?/?20082014?/?0?/?2000?

A web page having information for a train ticket from Madrid to Moscow leaving on Jul. 3, 2014 and returning on Aug. 10, 2014, without any price limits, at the address http://www.cheaptickets.example/?rail?/?Madrid?/?Moscow?/?03072014?/?10082014?/?0?/?nil?

As will be understood, the above example web pages are not an exhaustive list, and the host, http://www.cheaptickets.example would have several other web pages other than the ones listed above. As can be seen from the above listed exemplary web pages, the search query relevant host http://www.cheaptickets.example has a different web page associated with each specific value for a particular search parameter (i.e. travel starting point, travel end point, price range, dates and the like). For example, the first two of the above listed exemplary web pages hosted at http://www.cheaptickets.example are associated with two different values for the "departure parameter", namely Madrid and Vienna. In other words, depending on the user's search query, one or more specific one of the example web pages can be relevant to the user's search query.

Figure 3B:
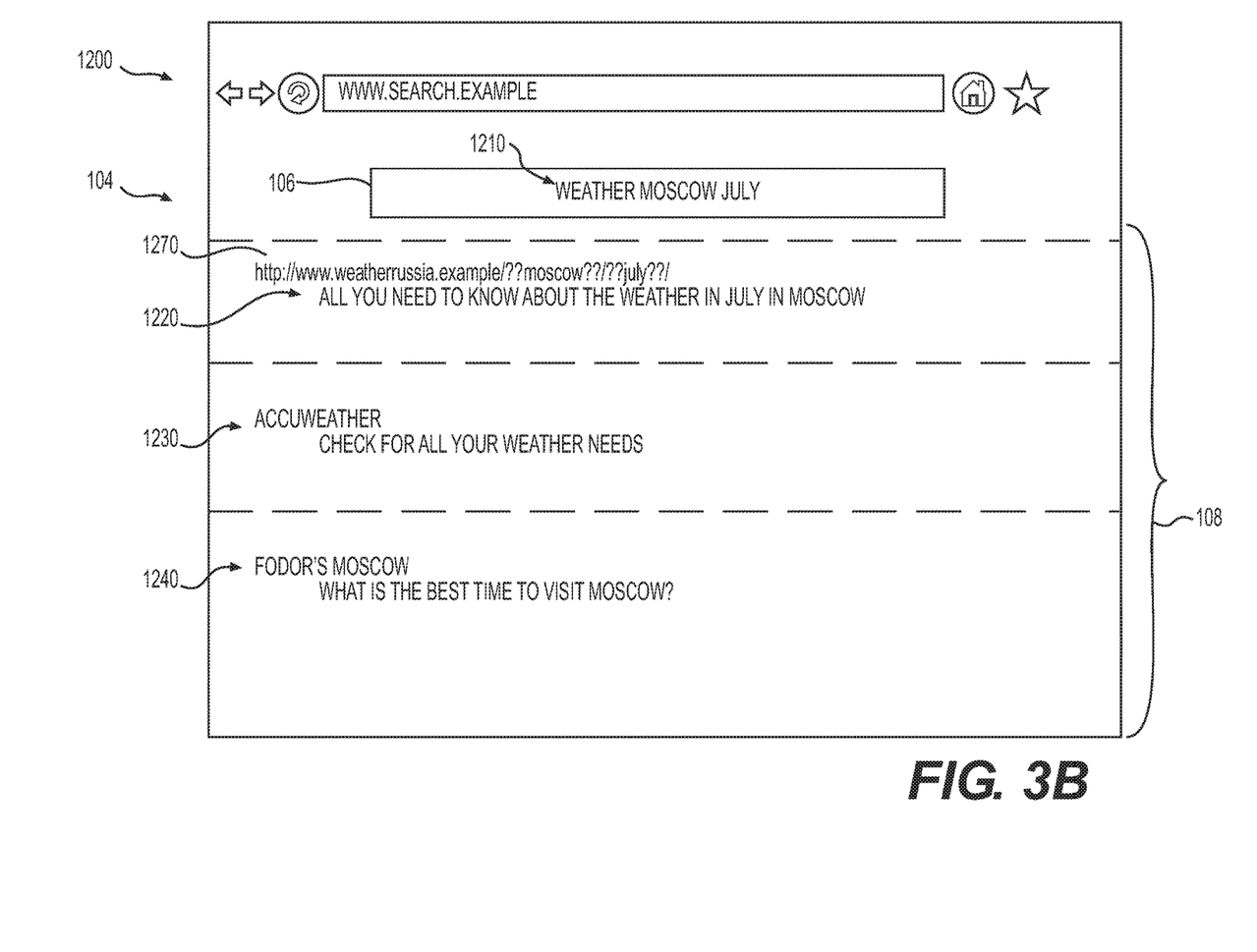
FIG. 3B illustrates a screen shot of another Search Results Page (SERP) including a deep link in accordance with non-limiting embodiments of the present technology.

With Reference to FIG. 3B, in exemplary scenario #2, the search query relevant host is determined to be http://www.weatherrussia.example which stores weather related information for Russia, including all the cities and regions considered to be encompassed in the geographical entity of Russia. The search query 1210 "weather Moscow July" is processed to determine that the user is looking for information related to the weather in the city of Moscow in the month of July. As Moscow is known to be in Russia, it is assumed that the site http://www.weatherrussia.example would have information for the weather in Moscow in the month of July. It is contemplated that, in some non-limiting implementations, a search could be performed based on "Moscow" to learn that Moscow is a city in the country of Russia. It is also contemplated that, in some non-limiting implementations, a search could be performed based on "Moscow" and "weather" to locate the search query relevant host site http://www.weatherrussia.example.

Figure 3C:
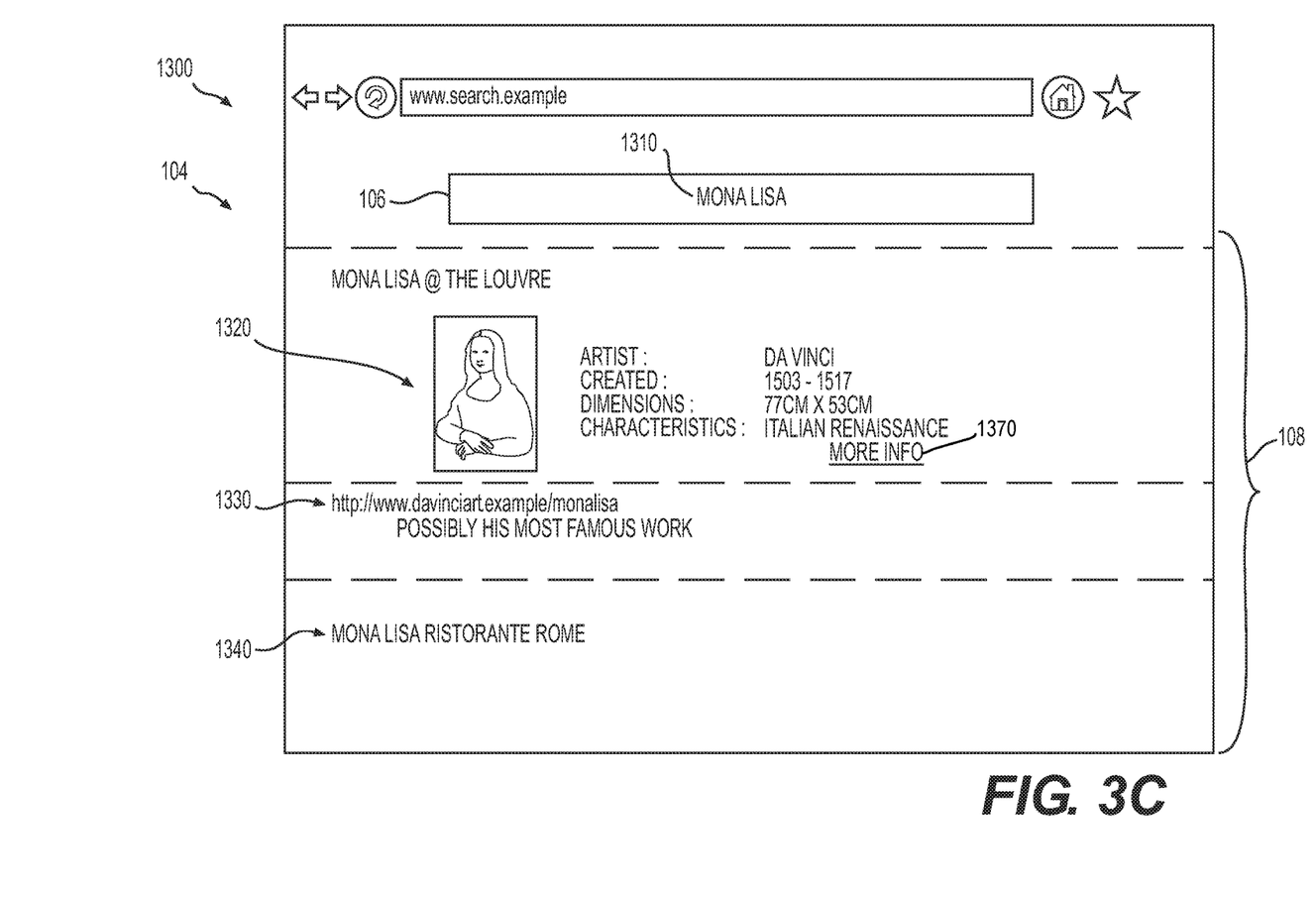
FIG. 3C illustrates a screen shot of yet another Search Results Page (SERP) including a deep link in accordance with non-limiting embodiments of the present technology.

With Reference to FIG. 3C, in exemplary scenario #3, the search query relevant host is determined to be the site for the Louvre museum http://www.louvre.example which stores information for all the art owned, or exhibited, whether currently, previously or planned for the future. The Mona Lisa is known to be housed at the Louvre museum, the site http://www.louvre.example is assumed to have the information relevant for the search query of exemplary scenario #3. In some non-limiting implementations, the search query 1310 "Mona Lisa" is processed to determine that the user is likely looking for information about the painting "Mona Lisa" (as opposed to, for example, two girls named Mona and Lisa). As mentioned above, the user's desire to search for information related to the painting "Mona Lisa" can be determined based on information such as, but not limited to, past searches performed at the electronic device 102, or based on the location of the electronic device 102 from which the search query is received. In alternative embodiments of the present technology, the user's specific search intent can be established based on the search query in combination with other users' interactions with search results presented to them in response to the same or similar search queries in the past. For example, the user's specific search intent can be determined based on what search results other users have selected in response to the same or similar queries in the past.

For example, previous searches conducted by the electronic device 102 may include searches related to other art created by Italian artists. As another example, the location of the electronic device 102 when the search query 1310 is received therefrom may be known to be an art school. In some non-limiting implementations, a search based on "Mona Lisa" may be performed, and thereby it may be determined that the painting is stored at the Louvre museum in order to determine that the site http://www.louvre.example is a search query relevant host.

It should be understood that although for each of the exemplary scenarios described above, the method 500 is described as determining a single search query relevant host, more than one search query relevant host can be determined based on the search query 1110, 1210, 1310 received at step 510. Thus, for example, in exemplary scenario #3, responsive to the search query "Mona Lisa", the site http://www.davinciart.example could be determined to be a second search query relevant host. The site http://www.davinciart.example is determined to be a search query relevant host based on the fact that the painting "Mona Lisa" is generally believed to be have been painted by Leonardo Da Vinci, and the fact that the site http://www.davinciart.example hosts several web pages related to different works of art attributed to Leonardo Da Vinci. In some non-limiting implementations, information about the painter of the painting being Leonardo Da Vinci could have been determined based on a search performed based on "Mona Lisa". Thus, in this case, the search based on "Mona Lisa" would be performed before determining that http://www.davinciart.example is a search query relevant host.

Generating a Search Query Relevant Resource Address

Once a search query relevant host is determined, the method 500 then proceeds to step 530 where a search query relevant resource address is generated. The search query relevant resource address is associated with a search query relevant resource. The search query relevant resource is a webpage having information relevant to the search query received at step 510. The search query relevant resource address is generated based on an address template associated with the search query relevant host. Once the search query relevant resource address is generated, the method 500 proceeds to step 540.

For exemplary scenario #1, the address template associated with the search query relevant host http://www.cheaptickets.example, as determined at step 520, has the form http://www.cheaptickets.example/?mode?/?departure?/?destination?/?departure date?/?return date?/?low price limit?/?upper price limit?

Based on the above-mentioned address template for exemplary scenario #1 and the search query received at step 510 for exemplary scenario #1, the search engine server 120 generates a search query relevant resource address http://www.cheaptickets.example/?flight?/?Madrid?/?Moscow?/?11072014?/?15072014?/?0?/?800?

Thus, in exemplary scenario #1, search query relevant resource address is generated by merging with the address template associated with the search query relevant host (determined at step 520), the search parameters obtained by processing the search query 1110 received at step 510. Specifically, the search query 1110 received at step 510, "Madrid to Moscow flight July 11 to July 15 below 800 euros", is processed to determine values for search parameters such as departure point (Madrid), destination (Moscow), departure date (11 Jul. 2014), return date (15 Jul. 2014), and upper price limit (800 Euros). As mentioned above, the processing of the search query 1110 includes parsing the search query 1110, obtaining relevant contextual, historical, location information related to the electronic device, and the like. The search query 1110 may be processed using any known methods and techniques including pattern extraction, machine learning, and the like. In the above exemplary scenario #1, since a value for lower price limit search parameter was not directly included in the search query 1110 received at step 510, the default lower price limit parameter value of 0 (representing 0 Euros) was used to generate the search query relevant resource address for exemplary scenario #1.

It should be understood that the above mentioned address template and the search query relevant resource address are exemplary only. In some implementations, the search query relevant resource address could include fields related to other search parameters such as desired currency, preferred carrier, number of stops and the like. These additional search parameters could have been entered as part of the search query. When the address template requires values for parameters of the search query relevant resource address that are not received as part of the search query at step 510, the address template parameter values could be filled in with default parameter values.

For exemplary scenario #2, the address template associated with the search query relevant host http://www.weatherrussia.example, as determined at step 520, has the form http://www.weatherrussia.example/??location??/??date??

Based on the above-mentioned scenario #2 address template and the search query received at step 510, the search engine server 120 generates a search query relevant resource address http://www.weatherrussia.example/??moscow??/??07**??

Thus, in exemplary scenario #2, the search query relevant resource address is generated by merging with the address template associated with the search query relevant host (determined at step 520), a portion of the search query received at step 510, specifically "Moscow".

For exemplary scenario #3, the address template associated with the search query relevant host http://www.louvre.example, as determined at step 520, has the form http://www.louvre.example/??category??/??name??

Based on the above-mentioned scenario #3 address template and the search query 1310 received at step 510, the search engine server 120 generates a search query relevant resource address http://www.louvre.example/??painting??/??monalisa??

Address Template

In some non-limiting implementations, the address template is received by the search engine server 120. In some non-limiting implementations, the address template is received from the search query relevant host. In some non-limiting implementations, the address template is received from the search query relevant host in response to a request communicated by the search engine server 120 to the search query relevant host. In some non-limiting implementations, a request for an address template is communicated by the search engine server 120 to a host responsive to receiving a search query at step 510, for which the particular host is determined to be a search query relevant host.

In some non-limiting implementations, the address template is received prior to receiving the search query 1110, 1210, 1310 at step 510. For example, the search engine server 120 may be configured to periodically fetch, from a host, the address template associated with that host, in order to be able to utilize the address template when needed responsive to the receiving of a search query 1110, 1210, 1310 and for which the host is determined to be the search query relevant host. In other non-limiting implementations, a host may be configured to provide its address template to the search engine server 120. For example, the host may be configured to provide an updated version of the address template to the search engine server 120 periodically, or when there is a change or update to the address template and/or the resources hosted by the host.

In some non-limiting implementations, the address template associated with a host including a plurality of resources (pages) is determined by the search engine server 120 instead of being received by the search engine server 120. In order to determine the address pattern associated with a particular host, the search engine server 120 could obtain the resource address of a subset or all of the plurality of resources hosted by that host, and then analyze the structure thereof. Analyzing the structure of the resource addresses could include any methods and techniques for pattern analysis and/or semantic analysis. The search engine server 120 could additionally correlate the resource address of a subset of the plurality of resources hosted by that host with the content of the resource in order to determine the address pattern and verify the determined address pattern. The methods and techniques for analyzing the resource addresses to obtain the address pattern could also be heuristic, or learned and refined with time. For this non-limiting implementation, in exemplary scenario #3, the search engine server 120 could determine the address pattern http://www.louvre.example/??[type of art]??/??[name of exhibit]?? by obtaining the resource address associated with a subset of webpages hosted at http://www.louvre.example and then performing a pattern analysis thereof.

It is also contemplated that, obtaining of the address template could include a combination of receiving and determining by the search engine server 120. For example, a basic or high level address structure could be received by the search engine server 120, either directly from the host, or indirectly therefrom. The search engine server 120 could then develop the address template for lower or deeper levels of the resources by analyzing a subset of the resources hosted by the host in conjunction with the received high level address structure.

Causing Display of a Search Engine Results Page (SERP)

At step 540, the electronic device 102 is caused to display a search engine results page (SERP) 1100, 1200, 1300 as can be seen in FIGS. 3A to 3C. It should be noted that FIGS. 3A to 3C are for illustration purposes only to assist in understanding of the present technology. The SERP 1100, 1200, 1300 shown in these Figures includes a plurality of search results. At least one of the search results is indicative of either or both of the above-mentioned search query relevant resource and the search query relevant resource address.

The search engine server 120 communicates with the electronic device 102 to cause the search results to be displayed on the user output interface of the electronic device 102, which in this embodiment, is the screen of the laptop computer 102. In some non-limiting implementations, the search engine server 120 sends HTML encoded instructions to cause the SERP 1100, 1200, 1300 to be displayed on the laptop screen.

The display of the SERP 1100, 1200, 1300 for exemplary scenarios #1, #2, #3 will now be discussed with reference to FIGS. 3A to 3C.

FIG. 3A illustrates a screen shot of a SERP 1100 corresponding to the search query 1110 of exemplary scenario #1. The screen shot shows the search application 104 having the query interface 106 with a query string 1110 "Madrid Moscow flight July 11 to 15 under 800 Euros" and the results interface 108 showing the search results 1120, 1130, 1140, 1150 for the search query 1110.

The top search result 1120 includes a hyperlink 1170 to a webpage hosted by the host www.cheaptickets.example. The hyperlink 1170 is what is known as a "deep link" in the art. The hyperlink 1170 is a URL (search query relevant resource address) that leads to a page which shows the details of a flight ticket available for 649 Euros for a flight from Madrid to Moscow, and allows the user to complete a purchase of the flight ticket shown. The search result 1120 also shows a snippet 1160 of the content from the webpage (search query relevant resource) indicating that the flight available is via Frankfurt on Aerocheapo Airlines. The displayed snippet 1160 is retrieved from the specific web page at the deep link 1170.

The SERP 1100 also includes other results 1130, 1140, 1150 pointing to other travel related sites. These other search results 1130, 1140, 1150 are in the form of hyperlinks comprising URLs that point to the landing pages of these sites. When the user clicks on these links provided in the search results 1130, 1140, 1150, the user is sent to the landing pages for these sites, from where the user can navigate to other pages hosted by the linked sites. These other search results 1130, 1140, 1150 are thus not in the form of deep links as shown herein. It should be understood, that the other search results 1130, 1140, 1150 are shown for illustrative purposes only, and the present technology is not intended to be limited to the number, type or format in which the search results 1130, 1140, 1150 are shown herein.

The SERP 1100 is not to be limited to only one deep link. The search result 1120 in the form of a deep link is shown as being the top link on the SERP 1100 in the illustrated implementation, but the present technology is not to be limited by the position of the deep link. The deep link search result 1120 could be a search result other than the top search result. Although, in some non-limiting implementations, the presence of a deep link may be taken into account in the ranking of search results, the present technology is not to be limited in this way.

In some non-limiting implementations, the search engine server 120 may verify the availability or the existence of the web page (search query relevant resource) associated with the search query relevant resource address generated responsive to the search query 1110 received at step 510 before causing the deep link search result 1120 to be included in the SERP 1100 displayed on the user electronic device 102. In some implementations, the search engine server 120 may send a request to the search query relevant host to verify the existence of the web page (search query relevant resource) associated with the search query relevant resource address generated responsive to the search query 1110 received at step 510. In some implementations, the search engine server 120 may have access to a list of existing web pages hosted by the search query relevant host, and could verify if the list includes the web page (search query relevant resource) associated with the search query relevant resource address generated responsive to the search query 1110 received at step 510. If the webpage is not found, non-existent, or not functional for any reason, the search engine server 120 may omit the associated deep link search result 1120 from the SERP 1100.

FIG. 3B illustrates a screen shot of a SERP 1200 corresponding to the search query 1210 of exemplary scenario #2. The screen shot shows the search application 104 having the query interface 106 with a query string 1210 "weather Moscow July" and the results interface 108 showing the search results 1220, 1230, 1240 for the search query 1210.

The top search result 1220 includes a hyperlink 1270 to a webpage hosted by the host www.weatherrussia.example.

The hyperlink 1270 is what is known as a deep link in the art. The hyperlink 1270 is a URL (search query relevant resource address) that leads to a page which shows current and past statistics for the weather in Moscow in the month of July. The search result 1120 does not shows a snippet of the content from the webpage (search query relevant resource) unlike in the SERP 1100 for exemplary scenario #1.

The SERP 1200 also includes another result 1230 pointing to another weather related site (Accuweather). The search result 1230 is a URL that leads to the landing page for AccuWeather, from where the user can navigate to the page for Moscow, and then to the page nested thereunder for the weather in Moscow in July. The SERP 1200 also includes a third search result 1140 that is a hyperlink to a travel related site (Fodors) for Moscow. Included in the travel relevant information provided by the Fodors site is presumably weather related information for Moscow. These other search results 1230, 1240 are thus not in the form of deep links as shown herein. It should be understood, that the other search results 1230, 1240 are shown for illustrative purposes only, and the present technology is not intended to be limited to the number, type or format in which the search results 1230, 1240 are shown herein.

FIG. 3C illustrates a screen shot of a SERP 1300 corresponding to the search query 1310 of exemplary scenario #3. The screen shot shows the search application 104 having the query interface 106 with a query string 1210 "Mona Lisa" and the results interface 108 showing the search results 1320, 1330, 1340 for the search query 1310.

The top search result 1320 includes a hyperlink 1370 to a webpage hosted by the host www.louvre.example which is the site for the Louvre Museum in Paris France where the painting Mona Lisa is housed. The hyperlink 1370 is also a deep link, and includes information about the famous painting. The information shown in the search result 1320 is obtained from the webpage devoted to the Mona Lisa painting and hosted by the host www.louvre.example. The hyperlink 1370 is in the text labelled "More Info" which, when selected, for example, by clicking on it with the laptop mouse, leads to the webpage for the painting Mona Lisa. Thus, even though the web address associated with the webpage for Mona Lisa is not displayed as such, the URL or link to the specific web-page is provided as part of the search result 1320. The search result 1320 is therefore also in the form of a deep link that leads directly to the webpage (search query relevant resource), and not just to the homepage for the Louvre Museum.

The SERP 1300 also includes another result 1330 which is also a deep link. The search result 1330 includes a URL that leads to the page dedicated to the Mona Lisa painting hosted by the site www.davinciart.example, the search query relevant host for this search result 1330. Similar to the search result 1220 of SERP 1200, the search result 1330 does not show any specific information or content from the web-page (search query relevant resource), other than a teaser heading "possibly his most famous work".

The SERP 1300 also includes a third search result 1340 that is a hyperlink to the homepage of a restaurant in Rome called "Mona Lisa". It should be understood, that the search results 1320, 1330, 1340 are shown for illustrative purposes only, and the present technology is not intended to be limited to the number, order, type or format in which the search results 1220, 1230, 1240 are shown herein.

It should also be understood that the search result 1120 of SERP 1100, the search result 1220 of the SERP 1200, and the search results 1320, 1330 of the SERP 1300 are obtained by the method 500 discussed above, and not by indexing of the host sites performed by crawling of the webpages hosted therein. The method 500 is much less resource intensive than the indexing and crawling method as is known in the art, and therefore advantageous for the search engine server 120 (in terms of resources consumed) as well as to the user (in terms of being able to access relevant search results in relatively short times).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of conducting a search, the method being executable at a search engine server communicatively coupled to a user electronic device via a communication network, the method comprising:
   receiving, by the search engine server via the communication network, a search query from the user electronic device;
   determining a search intent parameter by parsing the received search query;
   based at least on the determined intent parameter, determining a search query relevant host, the search query relevant host hosting a plurality of resources related to at least a portion of the search query, wherein at least one of the plurality of resources related to at least a portion of the search query has not been crawled by the search engine server by a time of the receiving the search query;
   based on the search query relevant host, receiving an address template associated with the search query relevant host;
   based on the address template associated with the search query relevant host, generating a search query relevant resource address indicative of an uncrawled search query relevant resource, the uncrawled search query relevant resource being relevant to the search query;
   the generating the search query relevant resource address comprising inserting at least a portion of the search query into the received address template of the search query; and
   causing the user electronic device to display a search engine results page (SERP), the SERP including a search result indicative of least one of:
      the uncrawled search query relevant resource retrieved using the generated search query relevant resource address; and
      the generated search query relevant resource address.

2. The method of claim 1, further comprising:
   after generating the search query relevant resource address, verifying the availability of the search query relevant resource at the search query relevant resource address.

3. The method of claim 1, wherein the address template is received from the search query relevant host.

4. The method of claim 1, further comprising:
receiving, from the search query relevant host, the address template associated with the plurality of resources of the search query relevant host.

5. The method of claim 4, wherein the address template is received from the search query relevant host prior to receiving the search query.

6. The method of claim 4, wherein the receiving occurs responsive to receiving the search query and determining the search query relevant host.

7. The method of claim 1, wherein
each of the plurality of resources is associated with a respective resource address; and
the address template is obtained by processing the respective resource address of each of the plurality of resources.

8. The method of claim 1, wherein each of the plurality of resources is associated with a respective resource address, and the address template comprises a rule for generating the respective resource addresses of each of the plurality of resources.

9. The method of claim 8, wherein said search query includes a search parameter, each of the plurality of resources being different from an other of the plurality of resources based on the search parameter.

10. A search engine server communicatively coupled to a user electronic device via a communication network, the search engine server comprising a processor configured to:
receive, by the search engine server via the communication network, a search query from the user electronic device;
determine a search intent parameter by parsing the received search query;
based at least on the determined intent parameter, determine a search query relevant host, the search query relevant host hosting a plurality of resources related to the search query, wherein at least one of the plurality of resources related to the search query has not been crawled by the search engine server by a time of the receiving the search query;
based on the search query relevant host, receive an address template associated with the search query relevant host;
based on receiving the address template associated with the search query relevant host, generate a search query relevant resource address indicative of an uncrawled search query relevant resource, the uncrawled search query relevant resource being relevant to the search query;
the generating the search query relevant resource address comprising inserting at least a portion of the search query into the received address template of the search query; and
cause the user electronic device to display a search engine results page (SERP), the SERP including a search result indicative of least one of:
the uncrawled search query relevant resource retrieved using the generated search query relevant resource address; and
the generated search query relevant resource address.

11. The search engine server of claim 10, wherein the processor is further configured to process the search query to determine a search parameter.

12. The search engine server of claim 10, wherein the processor is communicatively coupled to the search query relevant host for verifying the availability of the search query relevant resource at the search query relevant resource address after generating the search query relevant resource address.

13. The search engine server of claim 10, wherein the processor is communicatively coupled to the search query relevant host and further configured to receive the address template from the search query relevant host.

14. The search engine server of claim 10, wherein:
each of the plurality of resources is associated with a respective resource address; and
the processor is further configured to process the respective resource address of each of the plurality of resources of the search query relevant host to obtain the address template.

* * * * *